United States Patent
Jeong et al.

(10) Patent No.: US 8,840,806 B2
(45) Date of Patent: Sep. 23, 2014

(54) ABSORBENT FOR CAPTURING CARBON DIOXIDE INCLUDING AMINO ACID HAVING MULTI AMINE GROUPS AND METAL HYDROXIDE

(75) Inventors: Soon Kwan Jeong, Daejeon (KR); Sung Chan Nam, Daejeon (KR); Si Hyun Lee, Daejeon (KR); Sang Do Kim, Daejeon (KR); Dong Hyuk Jeon, Daejeon (KR); Yeo Il Yoon, Daejeon (KR); Il Hyun Baek, Daejeon (KR); Jin Ah Lim, Seoul (KR); Dae Hoon Kim, Bucheon-si (KR)

(73) Assignee: Korea Institute of Energy Research, Daejeon (KR)

( * ) Notice: Subject to any disclaimer, the term of this patent is extended or adjusted under 35 U.S.C. 154(b) by 371 days.

(21) Appl. No.: 13/271,040

(22) Filed: Oct. 11, 2011

(65) Prior Publication Data
US 2012/0153223 A1 Jun. 21, 2012

(30) Foreign Application Priority Data

Dec. 15, 2010 (KR) .................. 10-2010-0128444

(51) Int. Cl.
*C09K 3/00* (2006.01)
*B01D 53/14* (2006.01)
*B01D 53/40* (2006.01)

(52) U.S. Cl.
CPC ...... *B01D 53/1475* (2013.01); *B01D 2251/304* (2013.01); *B01D 53/1493* (2013.01); *B01D 2251/306* (2013.01); *B01D 2252/504* (2013.01); *B01D 2252/606* (2013.01); *B01D 2252/10* (2013.01); *Y02C 10/06* (2013.01); *B01D 2258/0283* (2013.01); *Y02C 10/08* (2013.01);
*B01D 2251/302* (2013.01); *B01D 2252/604* (2013.01); *B01D 2252/20494* (2013.01); *B01D 2251/604* (2013.01); *B01D 2252/61* (2013.01)
USPC ...... 252/192; 252/190; 252/184; 252/183.13; 423/228; 423/230; 423/236; 95/236

(58) Field of Classification Search
CPC ........................ B01D 53/62; B01D 2252/2041
USPC .............................. 252/192, 183.13; 423/230
See application file for complete search history.

(56) References Cited

U.S. PATENT DOCUMENTS 3,042,483 A * 7/1962 Wolfram et al. ........... 423/437.1
3,912,593 A * 10/1975 Barker et al. ................. 435/176
(Continued)

FOREIGN PATENT DOCUMENTS

WO 03095071 A1 11/2003

*Primary Examiner* — Joseph D Anthony
(74) *Attorney, Agent, or Firm* — Brooks Kushman P.C.

(57) ABSTRACT

Provided is an absorbent for capturing carbon dioxide. The absorbent may include an amino acid with multiple amine groups and an alkali-metal hydroxide mixed with the amino acid and thus, may increase an absorption capacity for carbon dioxide. When a sterically hindered effect is induced to the amino acid with multiple amine groups, the absorption capacity for carbon dioxide may increase and heat of absorption reaction may decrease and thus, energy consumed for regeneration of an absorbent may be reduced. The absorbent for capturing carbon dioxide may include amino acid with multiple amine groups and the metal hydroxide, and may provide a functional group around the amine groups to cause an sterically hindered effect and thus, the absorption capacity for carbon dioxide and an carbon dioxide absorption rate may increase, and the capital cost for a carbon dioxide capturing process and an operating cost may be significantly reduced.

7 Claims, 1 Drawing Sheet

(56) References Cited

U.S. PATENT DOCUMENTS

| | | |
|---|---|---|
| 5,749,941 A | 5/1998 | Jansen et al. |
| 7,591,878 B2 | 9/2009 | Feron et al. |
| 2006/0117954 A1 | 6/2006 | Versteeg et al. |
| 2010/0196104 A1* | 8/2010 | Constantz et al. ......... 405/302.4 |
| 2011/0120305 A1* | 5/2011 | Jiang ................................ 95/91 |

* cited by examiner

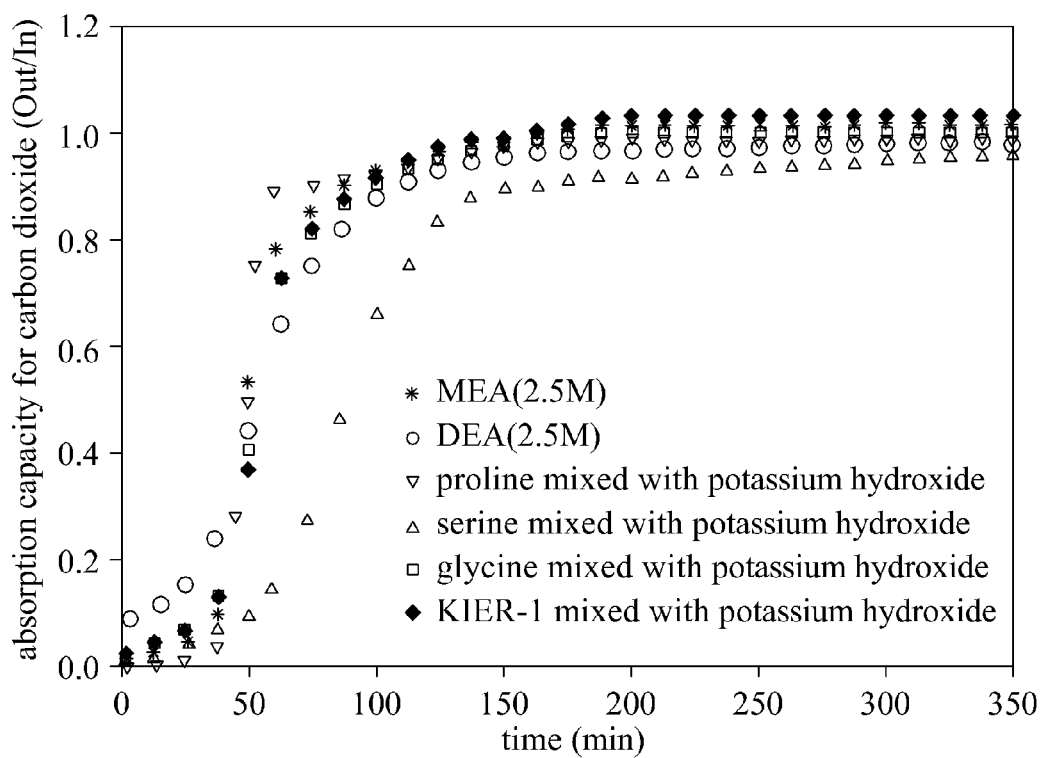

ABSORBENT FOR CAPTURING CARBON DIOXIDE INCLUDING AMINO ACID HAVING MULTI AMINE GROUPS AND METAL HYDROXIDE

CROSS-REFERENCE TO RELATED APPLICATIONS

This application claims priority to Korean Patent Application No. 10-2010-0128444, filed on Dec. 15, 2010, in the Korean Intellectual Property Office, the disclosure of which is incorporated herein by reference.

BACKGROUND

1. Field of the Invention

The present invention relates to an absorbent for capturing carbon dioxide, the absorbent including an amino acid with multiple amine groups and a metal hydroxide, and more particularly, to an absorbent used in an absorption process that removes carbon dioxide included in flue gases emitted from a process emitting a vast quantity of greenhouse gases, for example, a coal-fired power plant, a steel mill, a petrochemical process, and a cement business.

2. Description of the Related Art

As global climate change is getting worse, various attempts to reduce greenhouse gases have been made. Many countries focus on reducing emission of greenhouse gases, while maintaining continuous development. Developing a renewable energy that is an alternative for current fossil fuels takes time, and the International Energy Agency (IEA) expects that fossil fuels will account for at least 70% of energy expected to be consumed in 2050. Therefore, emission of greenhouse gases is inevitable [IEA, Energy Technology Perspective (2006)].

According to a Blue MAP scenario released by the IEA, 19% of technologies for reducing carbon dioxide that makes up a greatest portion of the greenhouse gases will be technology for carbon dioxide capture and storage, in 2050.

The technologies for capturing carbon dioxide emitted from a large scale process may be classified as a pre-combustion technology, oxyfuel-combustion technology, and a post-combustion technology. The post-combustion technology is applicable to a conventional process, and is expected to be commercialized since the technology is readily applied.

Technologies for absorbing carbon dioxide may be classified as a chemical absorption process and a physical absorption process, and is widely used in the oil industry, the natural gas industry, and the chemical industry. An absorption capacity of a chemical absorption solvent for carbon dioxide is significantly higher than a physical absorption solvent at a low pressure, whereas the absorption capacity of the physical absorption solvent is higher than the physical absorption solvent at a high pressure.

An absorbent regeneration technology of the chemical absorption process may include a heating process to regenerate the absorbent, and an absorbent regeneration technology of the physical absorption process may decrease a pressure in a system. An economical efficiency in the absorption process depends on a technology of increasing the absorption capacity of carbon dioxide and reducing an amount of energy consumed for regeneration of the absorbent. An organic amine-based compound, for example, alkanolamine, may be mainly used in the chemical absorption process. The mainly used amines may be classified as a primary amine including monoethanolamine (MEA) and diglycolamine (DGA), a secondary amine including diethanolamine (DEA) and di-iso-propylamine (DIPA), and a tertiary amine including triethanolamine (TEA) and methyl-diethanolamine (MDEA).

An absorbent having the highest absorption rate is MEA classified as the primary amine, and MEA absorbs carbon dioxide of 0.5 mol per absorbent of 1 mol. However, MEA consumes the highest amount of energy for regeneration of MEA, that is, 4.0 GJ/ton $CO_2$, which is a major drawback of MEA. An absorbent showing the greatest efficiency among amine absorbents developed so far is the KS series, that is, a sterically hindered amine developed by Misubishi Heavy Industry (MHI) and the KANSAI electric power Co. in Japan. The sterically hindered amine may be hydrolyzed into bicarbonate due to instability of carbamate formed when the sterically hindered amine absorbs carbon dioxide and thus, carbon dioxide is absorbed by the absorbent, carbon dioxide of 1 mol per absorbent of 1 mol.

Even through an amine absorption process is evaluated as a process to be easily commercialized along with an ammonia absorption process, the amine absorption process includes the following drawbacks.

Cost of Resupplying Absorbent

When an alkanolamine absorbent absorbs carbon dioxide and is regenerated, a heat stable salt is formed by oxygen and heat, the loss of solvent and a predetermined amount of absorbent is resupplied due to a loss caused by evaporation (MEA 1.5 kg/ton $CO_2$, KS-1 0.35 kg/ton $CO_2$).

Corrosion of Device Due to Absorbent

When a concentration of alkanolamine is increased to increase an amount of absorbed carbon dioxide, a device may become corroded. Therefore, the concentration of alkanolamine may be decreased or a corrosion inhibitor may be added.

High Regenerative Heat Used for Regeneration of Absorbent

A high regenerative heat may be used to cut off a strong chemical combining between an absorbent and absorbed carbon dioxide during a regeneration reaction.

Loss of Absorbent and Side Reaction

When an absorbent is applied to flue gases including a sulfur component, a tiny amount of $SO_2$ remaining after a flue gas desulfurization (FGD) device may cause a side reaction. A permissible level of SOx for KS-1 is less than or equal to 1.5 ppm. A reclaimer that is a separate device may be used to regenerate an absorbent degraded by the side reaction, and the reclaimer may consume additional energy.

One of processes to overcome the above described defects is a carbon dioxide absorption process using an amino acid salt. TNO in Holland filed an application associated with a process using an absorbent manufactured as the amino acid salt by mixing taurine amino acid and potassium hydroxide (KOH), and the application was granted (US publication No. 2006/0117954, international publication No. WO 03/095071, U.S. Pat. No. 7,591,878, and U.S. Pat. No. 5,749,941). When the absorbent used in the patent of TNO absorbs carbon dioxide, a salt is generated. Accordingly, when the absorbent is used in the absorption process, a membrane process or a spray tower may be used instead of a conventional absorption tower. Carbamate is generated as an intermediate according to an absorption reaction mechanism, and carbon dioxide of 0.5 mol per amino acid of 1 mol is absorbed.

The amino acid absorbent of TNO is less reactive to oxygen than an amine absorbent and thus, may not generate a heat stable salt, and a heat of absorption reaction is 10% less than MEA [Energy Proccedia 1, 1043-1050, 2009]. However, a higher absorption capacity for carbon dioxide and a higher carbon dioxide absorption rate may be needed to embody an economical process of capturing carbon dioxide.

SUMMARY

An aspect of the present invention provides an absorbent for capturing carbon dioxide, and the absorbent including an amino acid with multiple amine groups and metal hydroxide.

According to an aspect of the present invention, there is provided an absorbent for capturing carbon dioxide, the absorbent including an amino acid with multiple amine groups, and an alkali-metal hydroxide being mixed with the amino acid.

A molecular weight of the amino acid may be about 130 g/mol to about 150 g/mol.

The alkali-metal hydroxide may be selected from a group consisting of potassium hydroxide, lithium hydroxide, and sodium hydroxide.

The amino acid and the alkali-metal hydroxide may be mixed in an equivalent ratio of 1:1.

The absorbent may further include a material selected from a group consisting of an a corrosion inhibitor, a coagulant aid, an oxygen inhibitor, an antifoaming agent, and a mixture thereof.

Effect

According to the present invention, there may be provide an absorbent for capturing carbon dioxide, the absorbent including an amino acid with multiple amine groups and an alkali-metal hydroxide mixed with the amino acid and thus, may increase an absorption capacity for carbon dioxide.

According to the present invention, when a sterically hindered effect is caused to an amino acid with multiple amine groups, an absorption capacity for carbon dioxide may increase and heat of absorption reaction may decrease and thus, energy consumed for regeneration of an absorbent may be reduced.

According to the present invention, an absorbent for capturing carbon dioxide may include amino acid with multiple amine groups and a metal hydroxide, may provide a functional group around the amine groups to cause an sterically hindered effect and thus, an absorption capacity for carbon dioxide and an carbon dioxide absorption rate may increase, and capital cost for a carbon dioxide capturing process and an operating cost may be significantly reduced.

Additional aspects, features, and/or advantages of the invention will be set forth in part in the description which follows and, in part, will be apparent from the description, or may be learned by practice of the invention.

BRIEF DESCRIPTION OF THE DRAWINGS

These and/or other aspects, features, and advantages of the invention will become apparent and more readily appreciated from the following description of embodiments, taken in conjunction with the accompanying drawing in which:

FIG. 1 is a graph illustrating an absorption capacity of an absorbent with respect to carbon dioxide compared with comparison groups, according to an embodiment of the present invention.

DETAILED DESCRIPTION

Reference will now be made in detail to embodiments of the present invention, examples of which are illustrated in the accompanying drawings, wherein like reference numerals refer to the like elements throughout. Embodiments are described below to explain the present invention by referring to the figures.

Example embodiments provide an absorbent for capturing carbon dioxide.

The absorbent for capturing carbon dioxide may include an amino acid with multiple amine groups and may include a metal hydroxide that is mixed with the amino acid.

The absorbent for capturing carbon dioxide may be economical when the absorbent has a high absorption capacity for carbon dioxide and a low energy consumption for regeneration of the absorbent. When a number of combining sites that absorb carbon dioxide increases, the absorption capacity for carbon dioxide may increase. The combining site that absorbs carbon dioxide may be determined based on an amine group. According to an example embodiment, the absorbent for capturing carbon dioxide may use an amino acid with multiple amine groups and thus may increase the absorption capacity for carbon dioxide.

A molecular weight of the amino acid may be determined based on a number of amine groups. According to an example embodiment, a molecular weight of an amino acid included in the absorbent for capturing carbon dioxide may be about 130 g/mol to about 150 g/mol. When the absorbent that includes the amino acid with the molecular weight of about 130 g/mol to about 150 g/mol and that includes potassium hydroxide is used, the absorption capacity for carbon dioxide and an absorption rate may increase. An energy consumed for regeneration of the absorbent for capturing carbon dioxide may be reduced.

When a sterically hindered effect is induced around the amine groups, the absorption capacity for carbon dioxide may further increase. In a case of a conventional absorbent, such as monoethanolamine (MEA), reaction is terminated when carbamate is generated after MEA reacts with carbon dioxide. However, when carbamate is hydrolyzed into bicarbonate ($HCO_3^-$), the absorption capacity for carbon dioxide may further increase.

The increase of the absorption capacity for carbon dioxide is described based on following reaction mechanism.

According to a $CO_2$ absorption reaction mechanism of a primary amine with water solution and a secondary amine with water solution, for example, $RNH_2$, R denoting an alkyl group, a zwitterion, for example, $RNH_2^+COO^-$, that is an intermediate is generated as expressed by reaction 1. When a base component exists, $RNH_2^+COO^-$ reacts with the base component to generate another zwitterion as expressed by reaction 2.

$$CO_2 + RNH_2 \leftrightarrow RNH_2^+COO^- \quad \text{(reaction 1)}$$

$$RNH_2^+COO^- + B \leftrightarrow RNHCOO^- + BH^+ \quad \text{(reaction 2)}$$

In this example, B may denote a base, such as $RNH_2$, $H_2O$, $OH^-$ and the like.

In reaction 2, the generated zwitterion may be hydrolyzed into free amine and bicarbonate.

$$RNHCOO^- + H_2O \leftrightarrow RNH_2 + HCO_3^- \quad \text{(reaction 3)}$$

The stabler the zwitterions generated in reaction 2, for example, $RNHCOO^-$, the lower a progress of reaction 3 become and reaction 3 may be ignored. When B is $RNH_2$, an overall reaction may be expressed by reaction 4.

$$CO_2 + 2RNH_2 \leftrightarrow RNHCOO^- + RNH_3^+ \quad \text{(reaction 4)}$$

Monoethanolamine is the primary amine of which a stability of a zwitterion is high, and an amount of carbon dioxide to be absorbed by monoethanolamine of 1 mol is limited to 0.5 mol. However, when the zwitterion generated in reaction 2, for example, $RNHCOO^-$, is hydrolyzed into bicarbonate, absorbent of 1 _mol may capture carbon dioxide of 1 mol.

When the sterically hindered effect is induced since a functional group greater than hydrogen exists around the amine group of the generated absorbent, the generated zwitterion may be easily hydrolyzed into bicarbonate. When the functional group, for example, a methyl group or an ethyl group, that may cause the sterically hindered effect exists around the amine group to which carbon dioxide is combined, an amount of carbon dioxide absorbed per unit absorbent may increase. In this example, a coherence between the absorbent for capturing carbon dioxide and carbon dioxide may be weakened, and a relatively low amount of energy may be used for regeneration of absorbent that captured carbon dioxide and thus, an amount of energy consumed for regeneration of the absorbent may be reduced.

The absorbent for capturing carbon dioxide may include an amino acid with multiple amine groups that capture carbon dioxide and thus, may improve the absorption capacity for carbon dioxide. The absorption capacity for carbon dioxide may further increase by inducing the sterically hindered effect around the multiple amine groups of the amino acid.

When an amino acid with multiple amine groups is mixed with water solution, a zwitterion may be generated, and absorption reaction between the amino acid with the zwitterion and carbon dioxide may not occur. In this example, when a metal hydroxide is mixed, a change may occur in a state of the zwitterion and thus, the absorption capacity for carbon dioxide may significantly increase. The metal hydroxide may be an alkali-metal hydroxide, and the alkali-metal hydroxide may be selected from a group including potassium hydroxide, lithium hydroxide, and sodium hydroxide.

The absorption capacity of the absorbent that captures carbon dioxide may be changed based on a type of metal hydroxide. According to Examples, the absorption capacity for carbon dioxide may be increasingly high in an order of sodium hydroxide, lithium hydroxide, and potassium hydroxide (sodium hydroxide<lithium hydroxide<potassium hydroxide).

The metal hydroxide and the amino acid with multiple amine groups of the absorbent for capturing carbon dioxide may be mixed in an equivalent ratio of 1:1.

The absorbent for capturing carbon dioxide may be selected from a group including a corrosion inhibitor, a coagulant aid, an oxygen inhibitor, an antifoaming agent, and a mixture thereof.

The absorbent for capturing carbon dioxide may be manufactured by being mixed with the amino acid and the metal hydroxide, the amino acid including multiple amine groups that increase the number of combining sites by which carbon dioxide is absorbed and the metal hydroxide increasing absorption reactivity for carbon dioxide by changing a state of zwitterion. The absorbent for capturing carbon dioxide may show a relatively high absorption capacity for carbon dioxide, and may provide the sterically hindered effect to the amine groups and thus, may increase the absorption capacity for carbon dioxide, may decrease heat of reaction generated by absorption, and may have a relatively high carbon dioxide absorption rate.

The absorbent for capturing carbon dioxide may have an improved absorption capacity for carbon dioxide and an improved absorption rate compared with a conventional absorbent for carbon dioxide, such as MEA and diethanolamine (DEA) and thus, may decrease a size of an absorption tower, and may reduce the capital cost for a carbon dioxide capturing process and an operating cost.

The absorbent for capturing carbon dioxide may include the metal hydroxide and the amino acid with multiple amine groups, and may induce the sterically hindered effect by providing a functional group around the amine group. Accordingly, the absorption capacity for carbon dioxide may be 2 times greater than MEA, and absorption reaction may also be 2 times greater than MEA and thus, may reduce the capital cost for a carbon dioxide capturing process and an operating cost.

When the functional group that may cause the sterically hindered effect exists around amine group to which carbon dioxide is combined, an amount of carbon dioxide absorbed by per unit absorbent may increase and thus, a coherence between the absorbent and carbon dioxide may be weaken and energy consumed for regeneration of the absorbent may be reduced. the above described case is more economical, since the cost of energy consumed for regeneration of the absorbent accounts for 70% of the carbon dioxide capture and regeneration process.

The absorbent for capturing carbon dioxide shows the absorption capacity for carbon dioxide 2 times greater than MEA and thus, may reduce the diameter of the absorption tower by ½ and may reduce energy consumed for regeneration of the absorbent by 15% compared with MEA.

The absorption rate for carbon dioxide may be increased to be twice the monoethanolamine by appropriately changing a structure of the absorbent and thus, may significantly reduce the height of absorber.

Examples with respect to the absorbent for capturing carbon dioxide and results thereof are described.

Example 1

Absorption Capacity for Carbon Dioxide and Absorption Reaction Energy of Absorbent Using Amino Acid and Metal Hydroxide KIER-1 is an absorbent used in Example 1, and is an absorbent where potassium hydroxide and lysine among amino acids having multiple amine groups are mixed in an equivalent ratio of 1:1. The amino acid used in Example 1 has multiple amine groups, and a molecular weight of the amino acid is about 130 g/mol to about 150 g/mol. When the amino acid is mixed with water solution, a zwitterion is generated. Absorption reaction does not occur between the amino acid with the zwitterion and carbon dioxide. When an alkali-metal hydroxide including potassium, lithium, or sodium is mixed with the amino acid, a state of the zwitterion is changed and thus, the absorption capacity for carbon dioxide may significantly increase. According to a result of Example 1, the absorption capacity for carbon dioxide may be increasingly high in an order of sodium hydroxide, lithium hydroxide, and potassium hydroxide (sodium hydroxide<lithium hydroxide<potassium hydroxide), regardless of a type of amino acid.

The absorption capacity for carbon dioxide and the absorption reaction energy were measured based on a differential reaction calorimeter (DRC). The absorbent of 100 ml was put in a reactor of 250 ml, and mixed gas including carbon dioxide was put in the reactor at 298 K. In this example, a carbon dioxide in the mixed gas was included in flue gases of coal-fired power plant which emits a greatest amount of carbon dioxide, and carbon dioxide concentration of 12% was used. MEA classified as a primary amine MEA, DEA classified as a secondary amine DEA, proline mixed with potassium hydroxide, serine mixed with potassium hydroxide, and glycine mixed with potassium hydroxide were used as comparison groups. KIER-1 mixed with potassium hydroxide showed a highest absorption capacity as illustrated in FIG. 1. The result of Example 1 was quantitatively arranged as shown in Table 1.

TABLE 1

Absorption capacity of absorbent and heat of absorption reaction (25° C.)

| Absorbent | Volume of absorbent, Absorbed $CO_2$ (mol)/absorbent (mol) | Heat of absorption reaction (−kJ/mol $CO_2$) |
|---|---|---|
| MEA | 0.498 | 81.77 |
| DEA | 0.607 | 67.06 |
| glycine mixed with potassium hydroxide | 0.643 | 72.96 |
| serine mixed with potassium hydroxide | 0.574 | 79.42 |
| proline mixed with potassium hydroxide | 0.559 | 86.17 |
| KIER-1 mixed with potassium hydroxide | 1.021 | 68.15 |

In Table 1, KIER-1 mixed with potassium hydroxide shows an absorption capacity more than twice the MEA (absorbed $CO_2$ 0.498 (mol)/absorbent (mol)), and shows heat of absorption reaction 15% lower than MEA. Compared amino acids used as the comparison groups show absorption capacity similar to MEA and DEA and thus, the compared amino acids show absorption capacity lower than the amino acid that has multiple amine groups according to example embodiments.

The heat of absorption reaction may denote a value of heat emitted when absorption reaction is performed between carbon dioxide and the same amount of absorbent using a device for measuring heat of absorption reaction manufactured by Seraram. In this example, when the heat of absorption reaction is low, a small amount of energy may be consumed for regeneration of the absorbent.

Accordingly, the energy consumed for regeneration may be calculated based on the heat of absorption reaction, sensible heat, and latent heat, and the heat of absorption reaction may account for at least 50% of the energy consumed for regeneration. In this example, the sensible heat and the latent heat may be obtained by calculation and thus, the energy consumed for regeneration may be easily calculated when the heat of absorption reaction is measured as described below.

Energy consumed for regeneration=sensible heat+the heat of absorption reaction+latent heat.

In this example, sensible heat of amines and sensible heat of amino acids may react at 40° C., and may be regenerated at 120° C. and thus, sensible heat of amines and sensible heat of amino acids may be the same. The latent heat may denote latent heat of water included in the absorbent.

Example 2

Carbon Dioxide Absorption Rate of Absorbent Using Amino Acids and Metal Hydroxide A high carbon dioxide absorption rate and a high absorption capacity for carbon dioxide may be used for an economical absorption process that absorbs carbon dioxide. Even though an absorption capacity of a tertiary amine is 2 times greater than MEA classified as a primary amine, it is difficult to use the tertiary amine due to a low absorption rate. Example 2 evaluates the absorption rate based on a wetted wall column that accurately evaluates an absorption rate, using all absorbents mentioned in Example 1.

According to an overall mass transfer coefficient ($K_G$), a carbon dioxide absorption rate of KIER-1 that is the same absorbent used in Example 1 showed 2.02 E-10 mol/$cm^2$·sec·Pa that is 2 times faster than 1.11 E-10 mol/$cm^2$·sec·Pa of MEA. Also, the carbon dioxide absorption rate of KIER-1 is lower than proline and is higher than serine and glysine.

TABLE 2

Overall mass transfer coefficient of absorbent (25° C.)

| absorbent | Overall mass transfer coefficient, $K_G$(mol/$cm^2$ · sec · Pa) |
|---|---|
| MEA | 1.11E−10 |
| DEA | 4.26E−11 |
| Glycine mixed with potassium hydroxide | 1.73E−10 |
| serine mixed with potassium hydroxide | 8.55E−11 |
| proline mixed with potassium hydroxide | 3.51E−10 |
| KIER-1 mixed with potassium hydroxide | 2.02E−10 |

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An aqueous absorbent for capturing carbon dioxide, the absorbent comprising:
   a sterically hindered amino acid including multiple amine groups; and
   an alkali-metal hydroxide, the alkali-metal hydroxide and the amino acid being present in an equivalent ratio of about 1:1 (mol).

2. The absorbent of claim 1, wherein the amino acid has a molecular weight of about 130 g/mol to about 150 g/mol.

3. The absorbent of claim 1, wherein the alkali-metal hydroxide is selected from a group consisting of potassium hydroxide, lithium hydroxide, and sodium hydroxide.

4. The absorbent of claim 1, further comprising:
   a material selected from a group consisting of a corrosion inhibitor, a coagulant aid, an oxygen inhibitor, an antifoaming agent, and a mixture thereof 5. The absorbent of claim 1, wherein the aqueous absorbent has a carbon dioxide absorption capacity of about 1.021 mol absorbed $CO_2$ per mol of aqueous absorbent.

6. The absorbent of claim 1, wherein the aqueous absorbent has a heat of absorption reaction of about 68.15 −kJ/mol $CO_2$.

7. The absorbent of claim 1, wherein the aqueous absorbent has an overall mass transfer coefficient of about $2.02 \times 10^{-10}$ mol/$cm^2$·sec·Pa.

* * * * *